(12) United States Patent
Kishi

(10) Patent No.: US 9,165,364 B1
(45) Date of Patent: Oct. 20, 2015

(54) AUTOMATIC TRACKING IMAGE PICKUP SYSTEM

(71) Applicant: CANON KABUSHIKI KAISHA, Tokyo (JP)

(72) Inventor: Takuya Kishi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 139 days.

(21) Appl. No.: 14/133,708

(22) Filed: Dec. 19, 2013

(30) Foreign Application Priority Data

Dec. 26, 2012 (JP) .................................. 2012-282226

(51) Int. Cl.
*H04N 5/225* (2006.01)
*G06T 7/00* (2006.01)
*G06K 9/00* (2006.01)
*G08B 13/196* (2006.01)

(52) U.S. Cl.
CPC ............ *G06T 7/004* (2013.01); *G06K 9/00791* (2013.01); *G08B 13/19608* (2013.01)

(58) Field of Classification Search
CPC ............................................... G08B 13/19608
USPC ..................... 348/169–172, 208.14; 382/103; 396/153
See application file for complete search history.

(56) References Cited

U.S. PATENT DOCUMENTS

| | | | |
|---|---|---|---|
| 2001/0046309 A1* | 11/2001 | Kamei ......................... | 382/103 |
| 2008/0002028 A1* | 1/2008 | Miyata ......................... | 348/169 |
| 2008/0088707 A1* | 4/2008 | Iwaki et al. ................. | 348/208.1 |
| 2009/0252374 A1* | 10/2009 | Ishikawa et al. ............. | 382/103 |
| 2010/0013917 A1* | 1/2010 | Hanna et al. ................. | 348/143 |
| 2013/0120586 A1* | 5/2013 | Takashima .................... | 348/169 |

FOREIGN PATENT DOCUMENTS

| | | |
|---|---|---|
| JP | 0874296 A | 3/1996 |
| JP | 2002171439 A | 6/2002 |

* cited by examiner

*Primary Examiner* — Twyler Haskins
*Assistant Examiner* — Dwight C Tejano
(74) *Attorney, Agent, or Firm* — Rossi, Kimms & McDowell LLP

(57) ABSTRACT

An automatic tracking image pickup system including: an image pickup apparatus picking up an image of an object; a driving unit changing an image pickup direction of the image pickup apparatus; a recognition unit recognizing a tracking object in a picked up image; and a controller controlling a speed of the driving unit based on a difference between a position of the tracking object in the image and a target position in the image in an initial mode until the tracking object reaches a predetermined position in the image after the recognition unit recognizes the tracking object for first time, and in a normal mode after the tracking object reaches the predetermined position with a gain for obtaining the speed of the driving unit based on the difference in the normal mode being larger than a gain used in the initial mode.

17 Claims, 10 Drawing Sheets

AUTOMATIC TRACKING IMAGE PICKUP SYSTEM

BACKGROUND OF THE INVENTION

1. Field of the Invention

The present invention relates to an automatic tracking image pickup system for automatically tracking a target to be tracked, and more particularly, to an automatic tracking image pickup system including a camera platform which turns in accordance with a movement of the target to be tracked.

2. Description of the Related Art

In recent years, there has been proposed an automatic tracking camera system which recognizes an object by using an image recognition technology to perform zooming, panning, and tilting control over a camera provided on a camera platform so as to automatically track the object.

In the system described above, it is conventionally necessary to set in advance at which position in an image on a screen a target to be tracked is displayed before automatic tracking is started. As a setting method, Japanese Patent Application Laid-open No. H08-74296 discloses the following method. Specifically, an operator sets a target position of an object to be tracked in an image on a screen by using an operation apparatus. A camera platform is controlled so as to relatively stop the object at the set target position in the image on the screen during the automatic tracking. The related art disclosed in Japanese Patent Application Laid-open No. 2002-171439 uses a control technique of stopping camera-platform control while the object is moving toward a center of the image on the screen and performing tracking control while the object is moving to an outer side of the image on the screen.

In the related art disclosed in Japanese Patent Application Laid-Open No. H08-74296 described above, however, when the object to be tracked moves from the outside of the image on the screen to appear on the screen at the start of the automatic tracking, a large and sudden tracking operation is required to be performed because the position of the object is away from the set target position at that time. Moreover, when the object to be tracked is a moving body which moves in a given direction, if control for capturing the object to be tracked at the target position is performed immediately after the object to be tracked appears in the image on the screen, the tracking operation is performed for a direction opposite to the direction of movement, that is, becomes an unnecessary operation. In the related art disclosed in Japanese Patent Application Laid-Open No. 2002-171439, the control is not started until the object reaches the preset target position in the center of the image on the screen. Therefore, a sudden and unnecessary change in a video image does not occur. However, a relative positional relationship between the object and the target position is changed by the effects of a disturbance in image recognition for recognizing the object as the target to be tracked and the zoom control. Therefore, there is a disadvantage in that the tracking operation becomes unstable.

SUMMARY OF THE INVENTION

In view of the problems described above, the present invention has an object to enable tracking of an object to be tracked to a predetermined target position without causing a sudden and unnecessary change in a video image even when a position of the object to be tracked is far from the preset target position at the start of automatic tracking. The present invention therefore has an object to provide an automatic tracking image pickup system capable of performing a stable tracking operation even when an acquired value of the position of the object becomes unstable due to a disturbance in image recognition for identifying a target to be tracked or zoom control during the tracking.

According to one aspect of the present invention, An automatic tracking image pickup system, includes: an image pickup apparatus picking up an image of an object; a driving unit changing an image pickup direction of the image pickup apparatus; a recognition unit recognizing an object to be tracked in a pickup image obtained by the image pickup apparatus; and a controller controlling a speed of the driving unit based on a difference between a position of the object to be tracked in the pickup image and a target position in the pickup image, in which: the controller controls the speed of the driving unit in an initial mode until the object to be tracked reaches a predetermined position in the pickup image after the recognition unit recognizes the object to be tracked for first time, and in a normal mode after the object to be tracked reaches the predetermined position; and the controller controls the speed of the driving unit so that a gain for obtaining the speed of the driving unit based on the difference in the normal mode becomes larger than a gain used in the initial mode.

According to the automatic tracking image pickup system, the object to be tracked can be tracked to the predetermined target position without causing a significant change in a video image. Moreover, the stable tracking operation can be performed even when the acquired value of the position of the object becomes unstable due to the disturbance in the image recognition for identifying the target to be tracked or the zoom control during the tracking.

Further features of the present invention will become apparent from the following description of exemplary embodiments with reference to the attached drawings.

DESCRIPTION OF THE EMBODIMENTS

Figure 1:
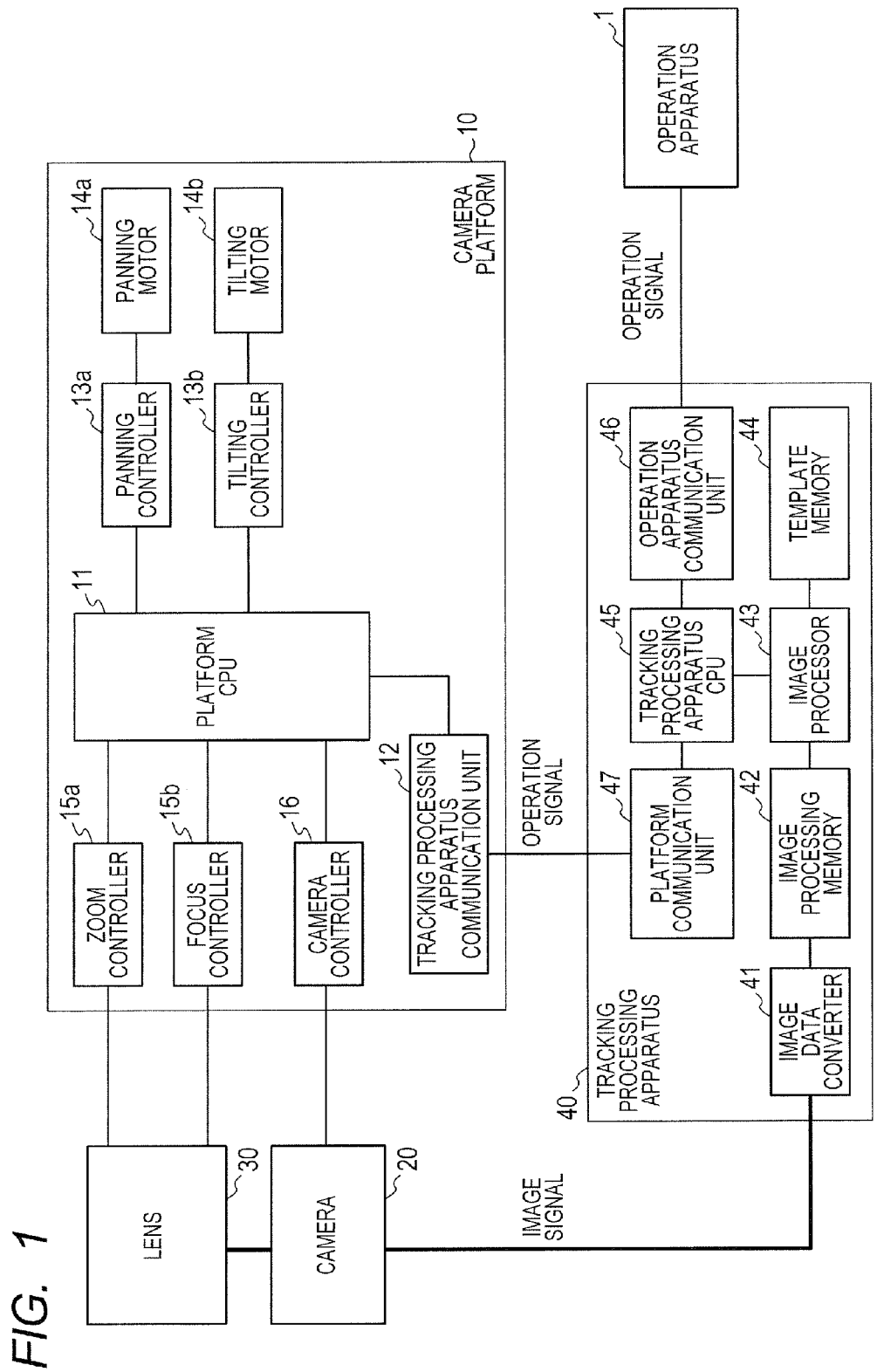
FIG. 1 is a configuration diagram illustrating a tracking system.

Exemplary embodiments of the present invention are described in detail referring to the accompanying drawings. FIG. 1 is a configuration diagram of an automatic tracking image pickup system according to the embodiments of the present invention.

First Embodiment

Referring to FIG. 1, a configuration according to a first embodiment of the present invention is now described.

An automatic tracking image pickup system according to the first embodiment includes a lens 30, a camera 20, a camera platform (driving unit) 10, an operation apparatus 1, and a tracking processing apparatus 40. The lens 30 includes a zoom function and a focusing function. The camera 20 receives object light from the lens 30 to pick up an object image. The camera platform 10 drives the camera 20 and the lens 30 to perform panning and tilting. The operation apparatus 1 is provided to operate the automatic tracking image pickup system.

The camera platform 10 includes a platform CPU 11, a tracking processing apparatus communication unit 12, a panning controller 13a, a tilting controller 13b, a panning motor 14a, a tilting motor 14b, a zoom controller 15a, a focus controller 15b, and a camera controller 16. The tracking processing apparatus communication unit 12 performs communication with the tracking processing apparatus 40. The zoom controller 15a controls zooming of the lens 30. The focus controller 15b controls focusing of the lens 30. The camera controller 16 controls the camera 20.

The camera platform 10 first receives an operation signal from the tracking processing apparatus 40 through the tracking processing apparatus communication unit 12. The received operation signal is read and interpreted by the platform CPU 11 so that an operation in accordance with the operation signal is performed. When the operation signal is a driving instruction for panning and tilting, the platform CPU 11 controls the panning controller 13a and the tilting controller 13b to drive the panning motor 14a and the tilting motor 14b. When the operation signal is a driving instruction for zooming and focusing, the platform CPU 11 controls the zoom controller 15a and the focus controller 15b to drive the lens 30. When the operation signal is any one of various control instructions to the camera 20, the platform CPU 11 controls the camera controller 16 to control the camera 20.

The tracking processing apparatus 40 includes an image data converter 41, an image processing memory 42, an image processor 43, a template memory 44, a tracking processing apparatus CPU 45, an operation apparatus communication unit 46, and a platform communication unit 47.

In the tracking processing apparatus 40, the image data converter 41 first converts an image signal of a pickup image, which is received from the camera 20, into image data for each frame and then stores the obtained image data in the image processing memory 42. The image processor 43 uses the image stored in the temperate memory 44 as a reference image to perform template matching based on a brightness pattern in comparison to the image stored in the image processing memory 42. In this manner, the image processor 43 determines whether or not an object to be tracked, which is a target object to be tracked, is present. When there is a region having a degree of similarly with the reference image stored in the image processing memory 42, which is higher than a preset threshold value TH of object recognition, it is determined that the object to be tracked is present. When the object to be tracked is present, the image processor 43 calculates coordinates $(X_{obj}, Y_{obj})$ of a barycenter of the object present in the pickup image and transmits the thus extracted object information to the tracking processing apparatus CPU 45 as current values. On the other hand, when there is no region whose degree of similarity exceeds the threshold value TH, the image processor 43 determines that the object to be tracked is not present and transmits the result of determination to the tracking processing apparatus CPU 45.

Figure 2:
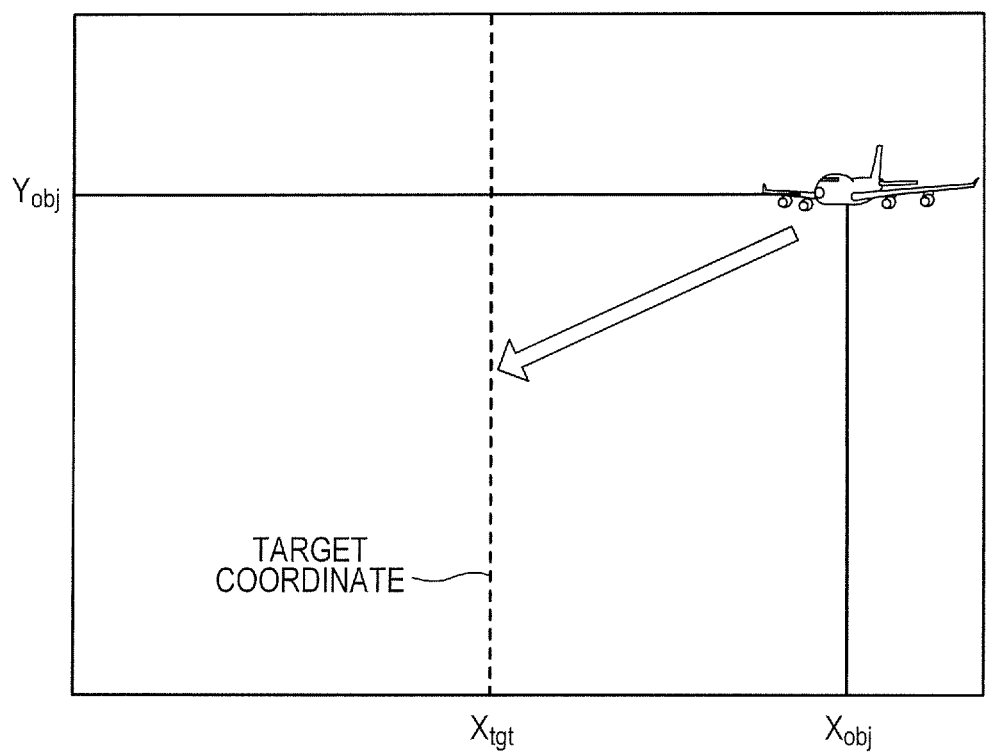
FIG. 2 is a monitor screen on which a target to be tracked and a tracking position are displayed.

For example, FIG. 2 is a monitor screen immediately after the object to be tracked enters an angle of view photographed by the camera 20 from the right side and is recognized. In this case, in addition to the information indicating the presence of the object to be tracked, the coordinates $(X_{obj}, Y_{obj})$ of the barycenter of the object are obtained as illustrated in FIG. 2, and are then transmitted to the tracking processing apparatus CPU 45. The tracking processing apparatus CPU 45 is a controller for controlling a speed of the driving unit (for panning, tilting, and zooming) based on a difference between the position of the object to be tracked in the pickup image and a target position in the pickup image (position at which the object is desired to be displayed ultimately). In the first embodiment, the object to be tracked moves as indicated by the arrow. After the coordinate $X_{obj}$ becomes equal to a target coordinate (predetermined position) $X_{tgt}$, a technique of determining a driving speed of the camera platform 10 for the tracking processing is switched. Specifically, a mode before the coordinate $X_{obj}$ becomes equal to the target coordinate (predetermined position) $X_{tgt}$ is referred to as an initial mode, whereas a mode after the coordinate $X_{obj}$ becomes equal to the target coordinate (predetermined position) $X_{tgt}$ is referred to as a normal mode.

Figure 3:
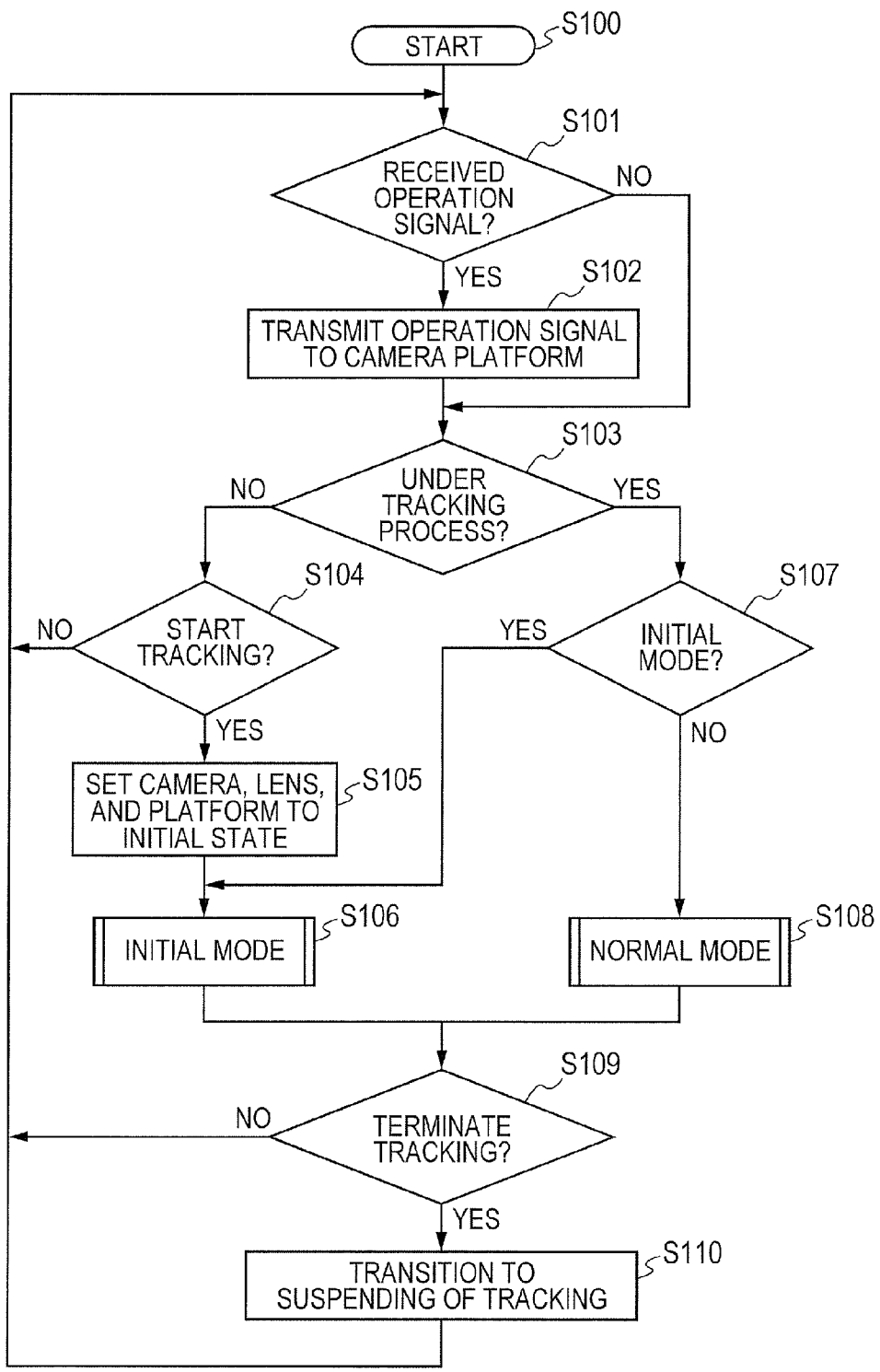
FIG. 3 is a flowchart illustrating tracking processing according to embodiments of the present invention.

A flow of processing by the tracking processing apparatus CPU 45 is now described referring to a flowchart of FIG. 3.

First, it is determined through the operation apparatus communication unit 46 whether or not an operation instruction from the operation apparatus 1 is received (S101). When the operation instruction is received, the operation signal is transmitted to the camera platform 10 (S102). Next, it is determined whether or not tracking is currently performed (S103). When the tracking is not currently performed, it is then determined whether or not to start the tracking (S104). When a tracking start condition is satisfied, the positions of the camera 20, the lens 30, and the camera platform 10 are set to their initial state (S105). When the tracking is not currently performed and the tracking start condition is not satisfied either, the processing returns to the processing for receiving the operation signal in Step S101. When the tracking is currently performed, whether or not a mode flag of the tracking processing indicates the initial mode is determined by referring to the mode flag (S107). When the mode flag indicates the initial mode, initial-mode processing described later is performed (S106). When the mode flag indicates not the initial mode but the normal mode, normal-mode processing described later is performed (S108). Finally, whether or not to terminate the tracking is determined (S109). When a tracking termination condition is satisfied as in the case where, for example, a tracking termination instruction is received from the operation apparatus 1 or the object to be tracked moves out of the image on the screen, the processing proceeds to suspension of tracking (S110). By repeating the processing in Steps S101 to S110 described above, a tracking operation for the object to be tracked is performed.

Figure 4:
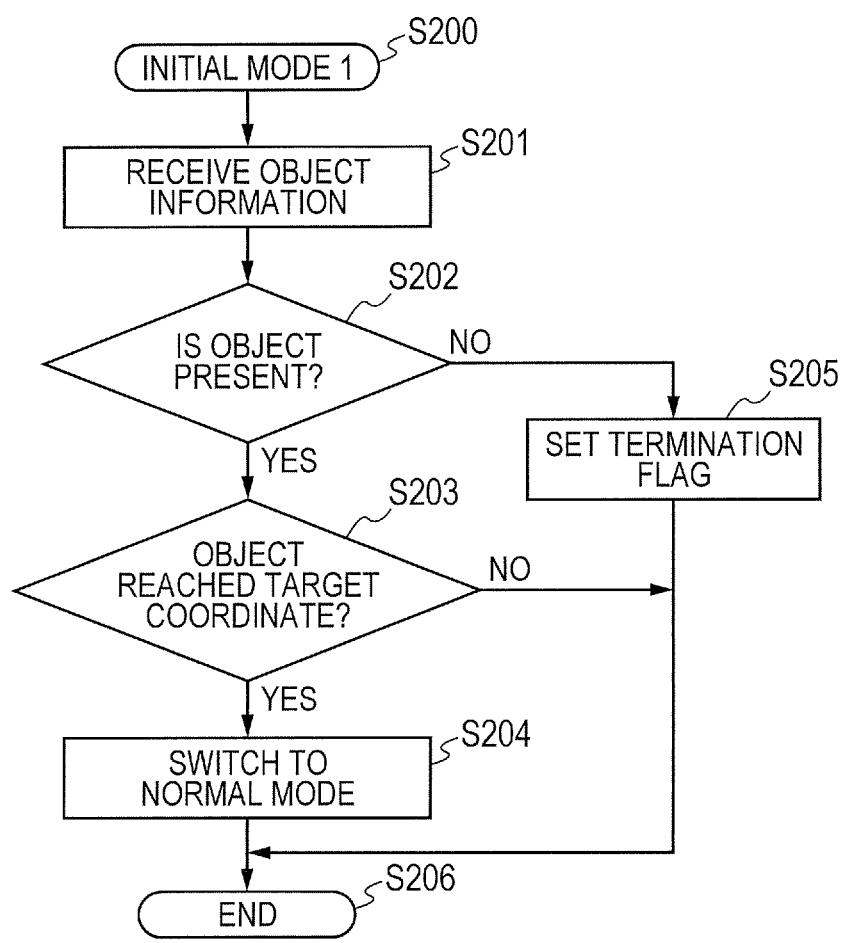
FIG. 4 is a flowchart illustrating initial-mode processing according to a first embodiment of the present invention.

Next, the details of the tracking processing in the initial mode S106 are described referring to a flowchart of FIG. 4.

The tracking processing apparatus CPU 45 receives the object information from the image processor 43 described above at the start of the tracking processing in the initial mode, in which the object information includes information as to whether or not the object is present in the image on the screen and as to positional information of the object is received in case where the object is present in the image on the screen (S201). Whether or not the object is present in the image on the screen is determined based on the received information of the object (S202). When it is determined that the object is present in the image on the screen, it is further determined whether or not the object has reached the target coordinate (predetermined position) (S203). In this embodiment, whether or not the object has reached the target coordinate is determined based on, for example, whether or not the X-coordinate value of the coordinates $(X_{obj}, Y_{obj})$ of the barycenter of the object has become equal to the target coordinate (predetermined position) $X_{tgt}$. However, the present invention is not limited thereto. When the object has reached the target coordinate (predetermined position), the mode flag of the tracking processing is switched to indicate the normal mode (S204). When the object has not reached the target coordinate (predetermined position), the above-mentioned processing is terminated, and the processing in the initial mode is continued. When the object is not present in the image on the screen in Step S202, a tracking termination flag is set (S205) to terminate the processing.

Figure 5:
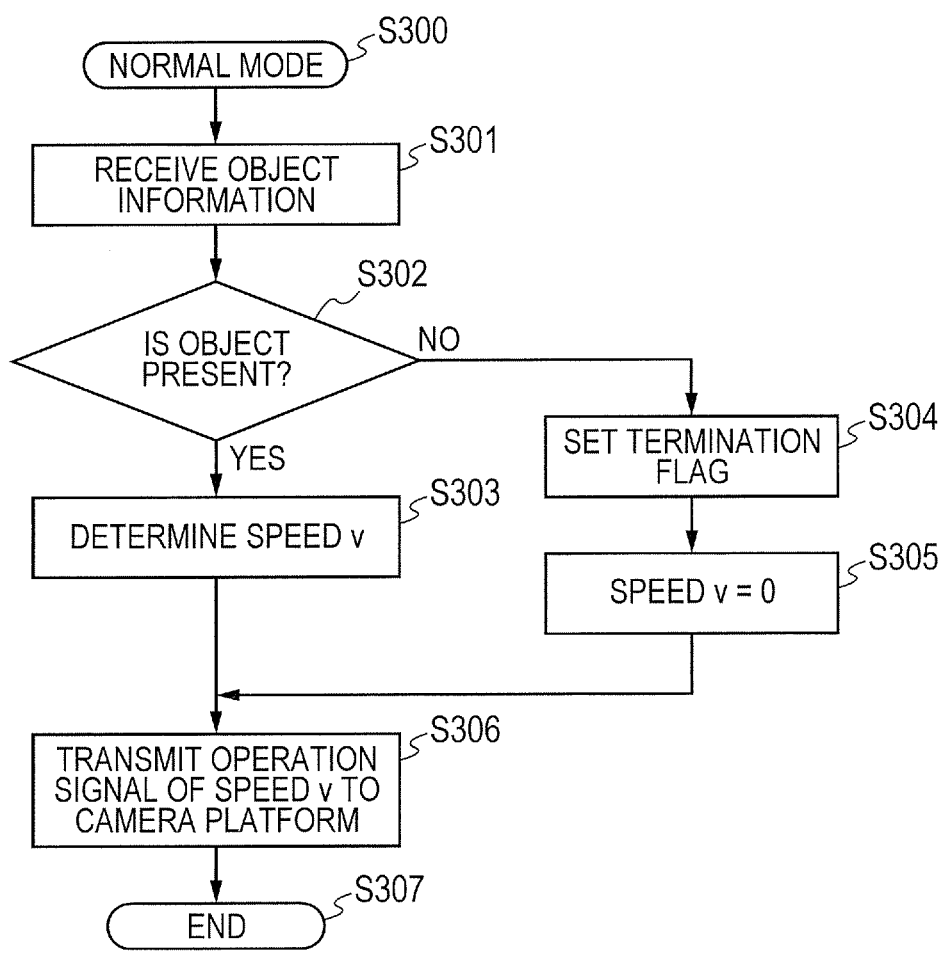
FIG. 5 is a flowchart illustrating normal-mode processing according to the first embodiment of the present invention.

Next, the details of the tracking processing in the normal mode S108 are described referring to a flowchart of FIG. 5.

At the start of the tracking processing in the normal mode, the tracking processing apparatus CPU 45 receives the object information (object information containing the positional information when the object is present in the image on the screen) from the image processor 43 described above (S301). Based on the received object information, whether or not the object is present in the image on the screen is determined (S302). When the object is present in the image on the screen, the tracking processing apparatus CPU 45, which is a controller, determines a speed v, at which a tracking operation of the camera platform 10 is to be performed, based on the difference between the position of the object in the pickup image and the target position in the pickup image (S303). When the object is not present in the image on the screen, the tracking termination flag is set (S304), and v=0 is set so as to stop the camera platform 10 (S305). Finally, the automatic tracking operation is performed by transmitting the operation signal to the camera platform 10 so that the camera platform 10 operates at the determined speed (S306).

As described above, the control over the camera platform 10 is stopped when the processing in the initial mode is performed. After the object reaches the position of the target coordinates, normal tracking control is started. In this case, the normal tracking control is as follows. Specifically, the driving speed is determined based on the difference between the position of the object in the pickup image and the target position in the pickup image (desired position, range, and size of object, which is to be displayed ultimately) so that the image pickup is continued at the position or within the range on a predetermined image pickup screen and in a predetermined image pickup size depending on a necessity. Then, the camera platform is driven to perform panning, tilting, and zooming at the thus determined driving speed.

After recognizing the object to be tracked for the first time, the tracking processing apparatus CPU 45 controls the speed of panning, tilting, and zooming (driving unit) in the initial mode until the object to be tracked reaches the predetermined position in the pickup image. After the object to be tracked reaches the predetermined position, the tracking processing apparatus CPU 45 controls the speed of panning, tilting, and zooming in the normal mode.

In the above-mentioned manner, a sudden and unnecessary operation for capturing the object at the start of tracking can be eliminated, thereby automatically tracking the object smoothly.

Second Embodiment

A second embodiment of the present invention is now described.

Figure 6:
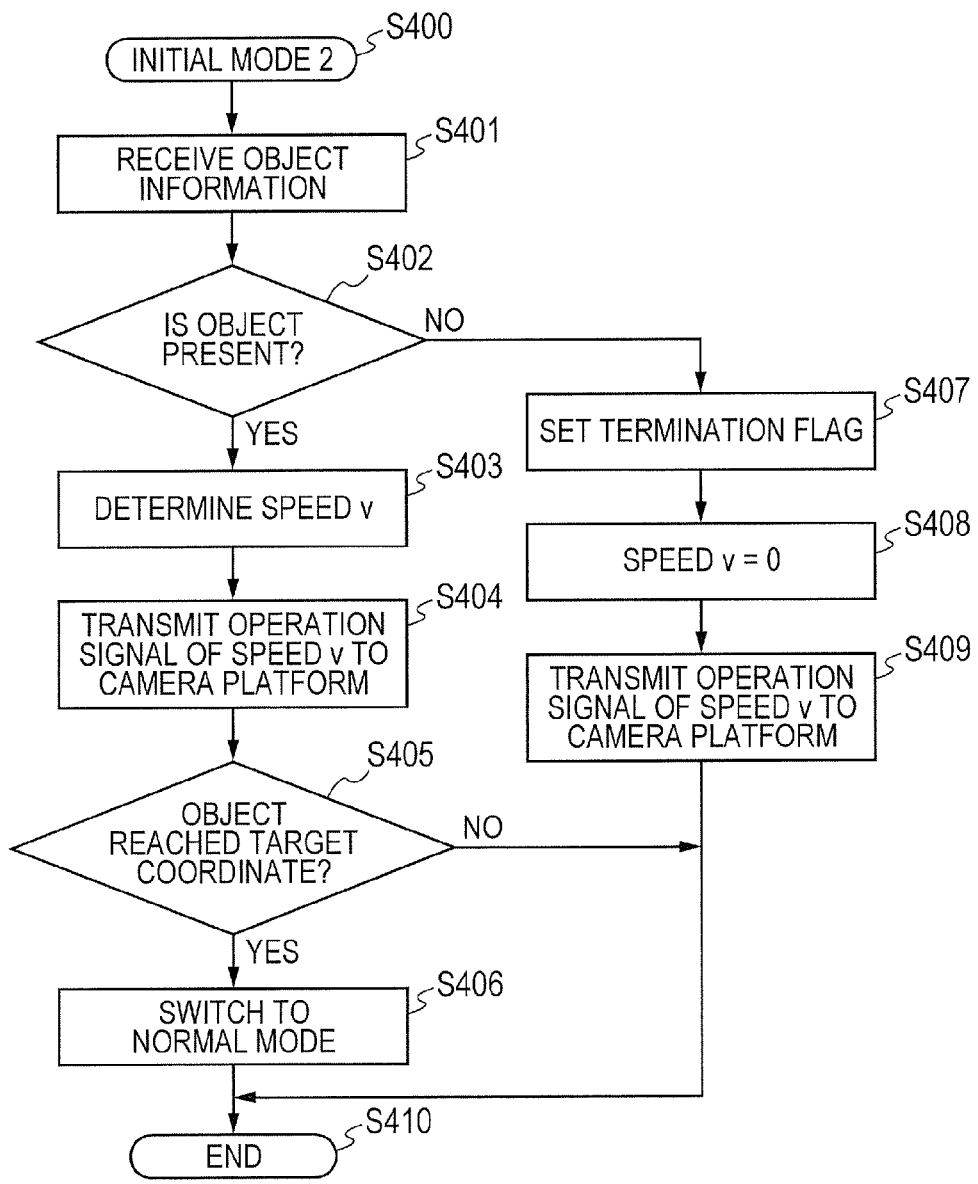
FIG. 6 is a flowchart of initial-mode processing according to a second embodiment of the present invention.

A configuration of an automatic tracking image pickup system according to the second embodiment is the same as that of the first embodiment illustrated in FIG. 1. Basic tracking processing is also the same as that illustrated in the flowchart of FIG. 3. However, processing by the tracking processing apparatus CPU 45 in Step S106 in the initial mode is different from that illustrated in FIG. 3. Therefore, a flowchart of processing by the tracking processing apparatus CPU 45 in the initial mode according to the second embodiment is illustrated in FIG. 6. The tracking processing S108 in the normal mode is the same as that in the first embodiment.

First, similarly to the first embodiment, the tracking processing apparatus CPU 45 receives the recognition information of the object (S401) to determine whether or not the object is present (S402). When the object is present, the speed v suitable for tracking (speed based on the difference between the position of the object in the pickup image and the target position in the pickup image (desired position, range, and size of the object, which is to be displayed ultimately)) is determined (S403). Then, the operation signal of the speed v is transmitted to the camera platform 10 (S404). Next, whether or not the object has reached the target coordinate (predetermined position) is determined (S405). When the object has reached the target coordinate, the mode flag of the tracking processing is switched to indicate the normal mode (S406). When the object has not reached the target coordinate (predetermined position), the processing is terminated and the processing in the initial mode is continued. When it is determined in Step S402 that the object is not present, the tracking termination flag is set (S407) and the speed v=0 is set (S408). After the operation signal of the speed v is transmitted to the camera platform 10 (S409), the processing is terminated. As compared with the speed v determined in Step S303 in the normal-mode processing described above, a control gain is lowered and therefore, the speed v determined in Step S403 becomes lower. Specifically, the tracking processing apparatus CPU 45 controls the speed of panning and tilting so that a gain for obtaining the speed of panning and tilting based on the difference between the position of the object in the pickup image and the target position in the pickup image (desired position, range, and size of the object, which is to be displayed ultimately) in the normal mode becomes larger than the gain in the initial mode. Alternatively, the camera platform 10 may be controlled at a lower speed as the object is located closer to the outer portion (peripheral portion) of the pickup image (as a difference between the current position of the object in the pickup image and the target position becomes larger). Specifically, the tracking processing apparatus CPU 45 performs control so that the speed of panning and tilting when the object to be tracked is at a position in the picked up image in the initial mode becomes lower than the speed of panning and tilting when the object to be tracked is at the position in the picked up image in the normal mode.

As described above, during the tracking processing in the initial mode before the object reaches the position of the target coordinate, the camera platform 10 is operated to track the object at a lower speed than that during the normal tracking control. As a result, immediately after the object is recognized in the pickup image, the object can be captured at the position of the target coordinate without a sudden operation of the camera platform 10.

Figure 7:
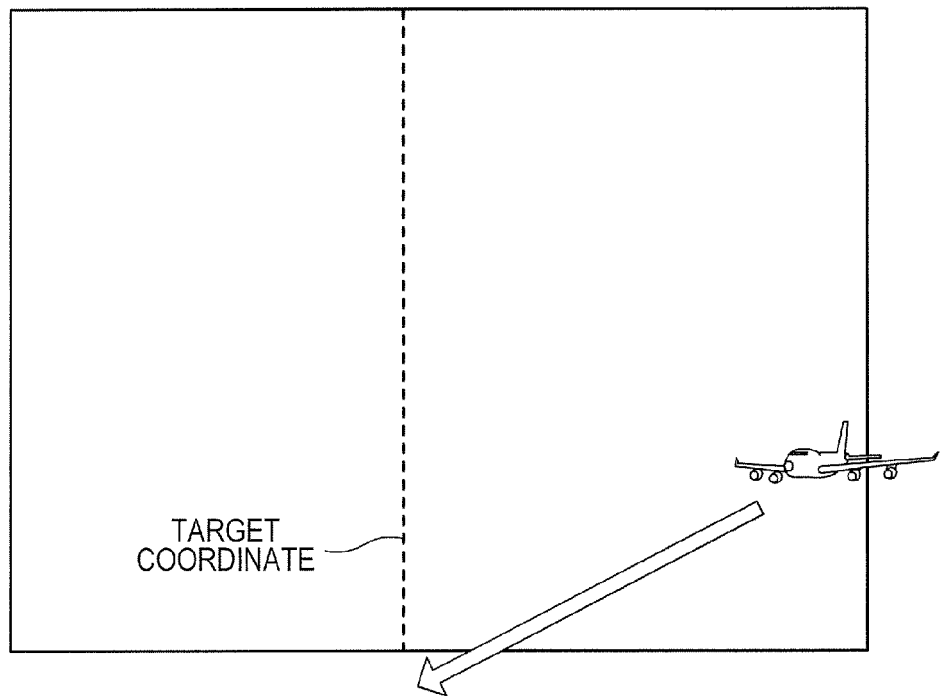
FIG. 7 is an explanatory view illustrating a tracking state according to the second embodiment of the present invention.

FIG. 7 illustrates the screen on which the object enters from the right of the screen and moves out of the screen before reaching the target coordinate. In the processing procedure according to the first embodiment, the object which moves as illustrated in FIG. 7 cannot be tracked. However, in the second embodiment, the camera platform 10 is operated at a low speed during the processing in the initial mode to track the object. Therefore, the object can be tracked without being lost.

Third Embodiment

A third embodiment of the present invention is now described.

Figure 8:
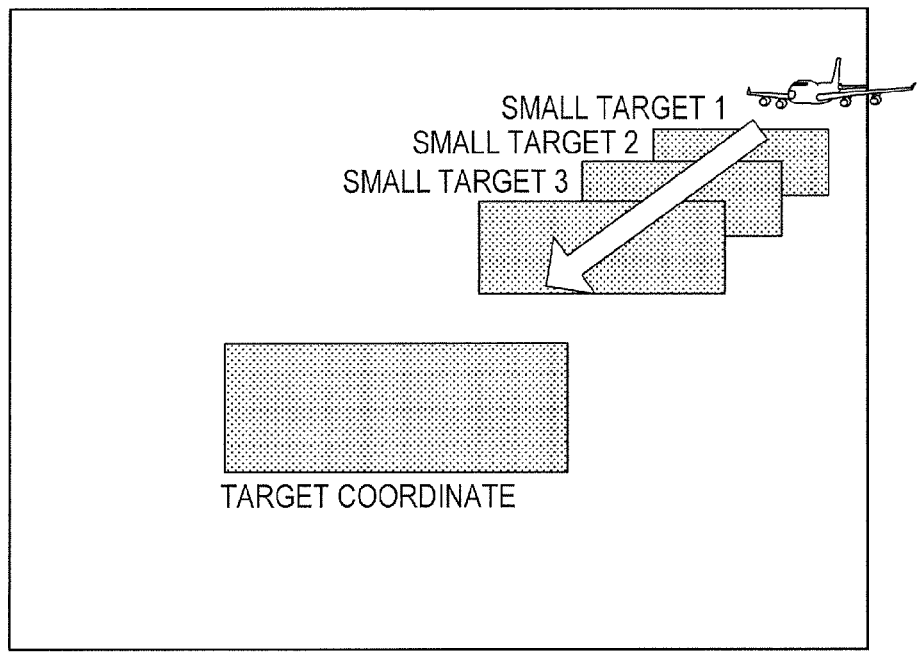
FIG. 8 is an explanatory view illustrating a procedure of a tracking technique according to a third embodiment of the present invention.

A configuration of an automatic tracking image pickup system according to the third embodiment is the same as that of the first embodiment illustrated in FIG. 1. Basic tracking processing is also the same as that illustrated in the flowchart of FIG. 3. However, processing by the tracking processing apparatus CPU 45 in Step S106 in the initial mode is different from that illustrated in FIG. 3. The third embodiment is characterized in that the target coordinate (target position or target-position range) for capturing the object which is the target to be tracked is updated as needed during the processing in the initial mode. FIG. 8 illustrates an example where the object is guided to a final target coordinate while the target coordinates are updated. When the object appears in the image on the screen and the tracking is started, the camera platform 10 is first operated so that the object is captured at a position of a small target 1. Then, the object is sequentially guided to a small target 2, a small target 3, and the like in the stated order. Finally, the object is kept to the target coordinates used in the normal mode. A method of updating the target coordinates (method of setting the small targets) described above is selected from the following two techniques. The first method involves updating the target coordinates so that the object reaches the position of the target coordinates used in the normal mode after elapse of a constant time period (update method 1). The second method involves detecting an initial movement vector of the object by the tracking processing apparatus CPU 45 which is a moving-speed calculating unit and to update the target coordinates so that the object moves at the speed detected by the tracking processing apparatus CPU 45 to reach the target coordinates used in the normal mode at optimal time (update method 2). The tracking processing in Step S108 in the normal mode is the same as that in the first embodiment described above.

Figure 9:
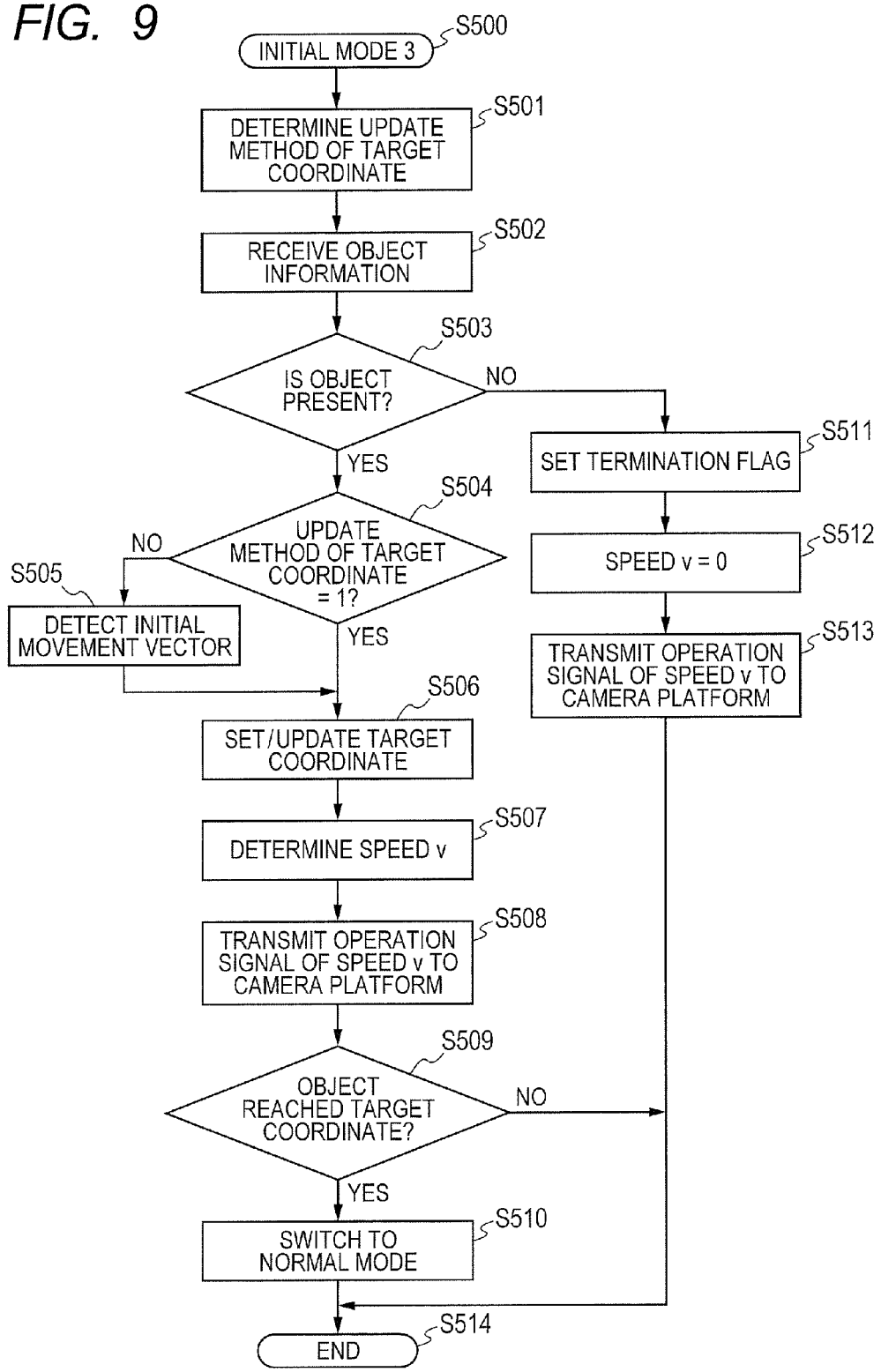
FIG. 9 is a flowchart illustrating the initial-mode processing according to the third embodiment of the present invention.

Processing by the tracking processing apparatus CPU 45 in the initial mode according to the third embodiment is now described referring to a flowchart of FIG. 9.

First, the method of updating the target coordinates so as to capture the object within the image on the screen is determined (S501). Then, as in the first and second embodiments, the recognition information of the object is received (S502). Then, whether or not the object is present is determined (S503). When the object is present, whether or not the method of updating the target coordinates, which is determined in Step S501, is the update method 1 described above is determined (S504). When the update method is the update method 2 described above, the initial movement vector of the object is detected (S505). Then, the tracking processing apparatus CPU 45, which is also a target value calculator, sets or updates the target coordinates in accordance with the selected update method (S506). Next, the tracking processing apparatus CPU 45, which is also the controller, determines the speed v suitable for tracking (S507), and transmits an operation signal of the speed v to the camera platform 10 (S508). Finally, the tracking processing apparatus CPU 45 determines whether or not the object has reached the position of the target coordinates (S509). When the object has reached the position of the target coordinates, the mode flag of the tracking processing is switched to the normal mode (S510). When the object has not reached the position of the target coordinates, the processing is terminated, and the tracking processing in the initial mode is continued. When it is determined in Step S503 that the object is not present, the tracking termination flag is set (S511). Then, the speed is set as: v=0 (S512). After the operation signal of the speed v is transmitted to the camera platform 10 (S513), the processing is terminated.

As described above, during the processing in the initial mode before the object reaches the position of the target coordinates, the tracking control is performed while the target coordinates are updated. As a result, the tracking control over the object to the target coordinates can be performed without performing a sudden operation at the start of tracking. Moreover, by controlling a trajectory of the object in the image on the screen until the object reaches the position of the target coordinate during the processing in the normal mode, a good tracking image can be acquired.

Fourth Embodiment

A fourth embodiment of the present invention is now described.

A configuration of an automatic tracking image pickup system according to the fourth embodiment is the same as that of the first embodiment illustrated in FIG. 1.

Figure 10:
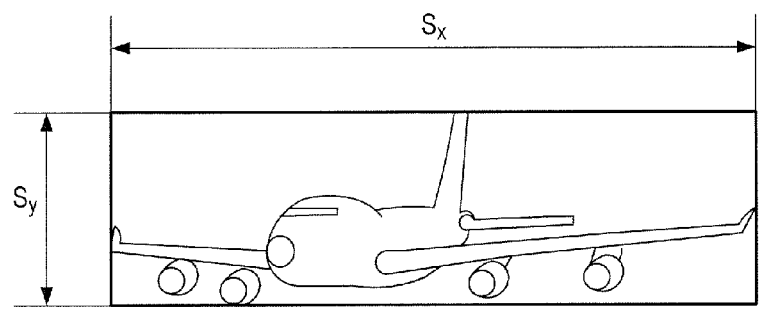
FIG. 10 is a graph showing a recognition region when the target to be tracked is recognized.

In the first to third embodiments described above, the turning control for panning and tilting has been mainly described. On the other hand, in the fourth embodiment, besides the turning control for panning and tilting, zoom control is described. FIG. 10 shows the object to be tracked and a region $(S_x, S_y)$ (current values) of the object, which is recognized by the tracking processing apparatus 40. During the processing in the normal mode according to the fourth embodiment, the zoom control is performed so that an object size (diagonal length of the object region shown in FIG. 10) in the pickup image is kept to a predetermined constant value (target position).

Figure 11:
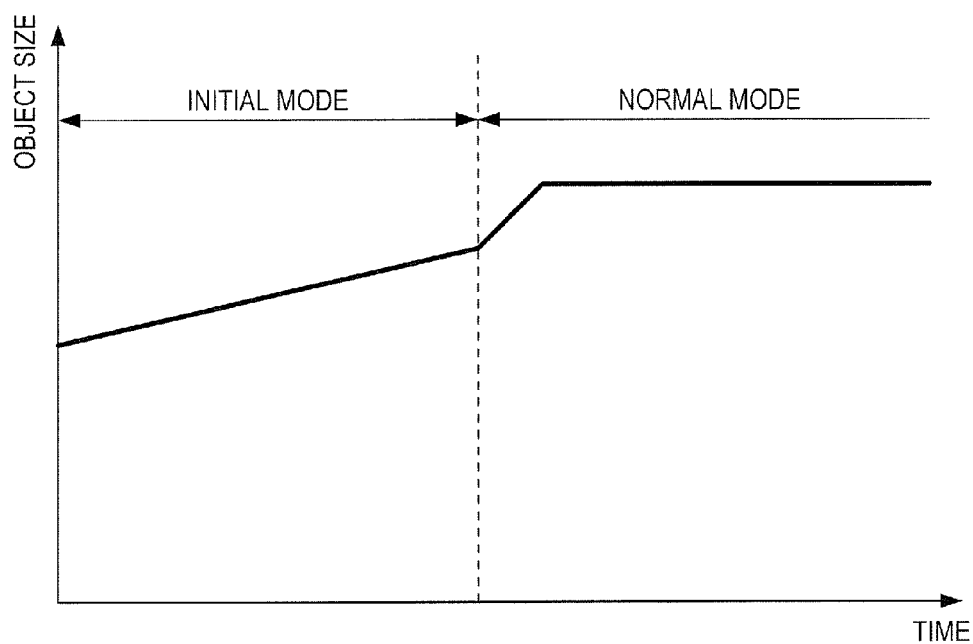
FIG. 11 is a graph showing a temporal transition of a recognition size of an object according to a fourth embodiment of the present invention.

Processing by the tracking processing apparatus CPU 45 according to the fourth embodiment is characterized in that the zoom control is stopped (zooming speed is set to zero) during the processing in the initial mode before the object reaches the position of the target coordinates. FIG. 11 shows a temporal transition of a value of an object size in the image on the screen in the fourth embodiment. As the object in this example, a moving body, which is initially at a distance and is gradually coming closer, is assumed. The zoom control is stopped during the processing in the initial mode. The object size in the image on the screen gradually becomes larger as the object comes closer to the camera platform 10. After the initial mode is switched to the normal mode, the object size in the image on the screen is adjusted to the set constant value. Thereafter, the zoom control is performed so that the object size in the image on the screen is maintained.

As described above, by stopping the zoom control during the processing in the initial mode, a relative positional relationship between the object and the target coordinates in the image on the screen is fixed. Therefore, stable panning and tilting control can be realized by the simple processing. With the configuration of the fourth embodiment, if the object size in the image on the screen greatly changes while the zoom control is in the stopped state, a relative moving speed of the object in the image on the screen disadvantageously changes. Therefore, the fourth embodiment is desired to be employed under conditions where the object size in the image on the screen does not greatly change during the processing in the initial mode.

Fifth Embodiment

A fifth embodiment of the present invention is now described.

A configuration of an automatic tracking image pickup system according to the fifth embodiment is the same as that of the first embodiment illustrated in FIG. 1. A definition of the object size in the image on the screen and the control method during the processing in the normal mode are the same as in the fourth embodiment.

Figure 12:
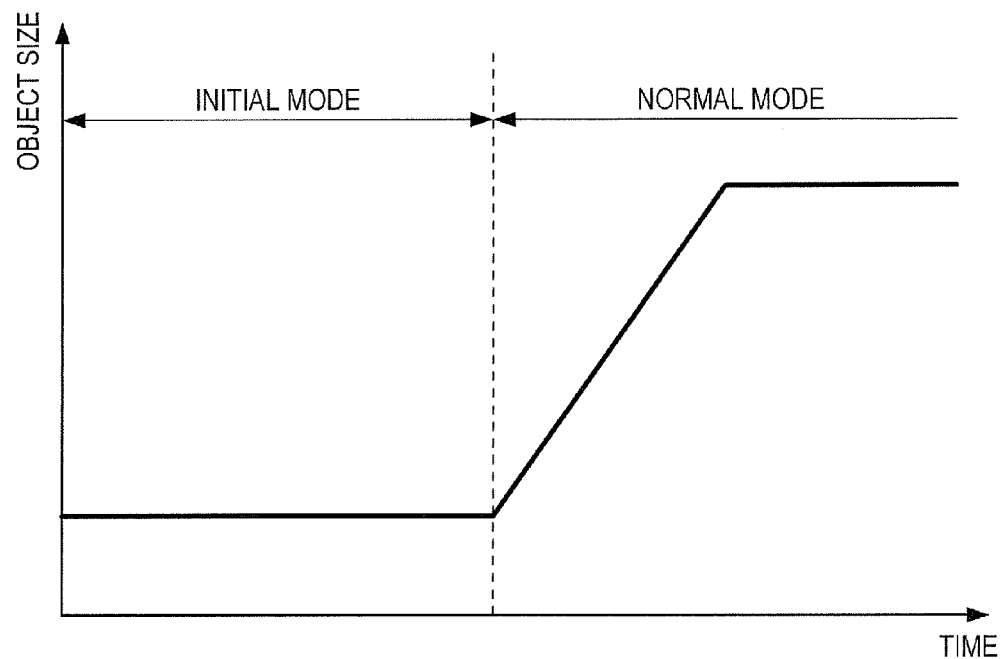
FIG. 12 is a graph showing a temporal transition of the recognition size of the object according to a fifth embodiment of the present invention.

Processing by the tracking processing apparatus CPU 45 according to the fifth embodiment is characterized in that the zoom control is performed so that the object size in the pickup image at the time of the first recognition of the object is maintained during the processing in the initial mode before the object reaches the position of the target coordinates. FIG. 12 shows a temporal transition of the value of the object size in the image on the screen according to the fifth embodiment. As the object in this example, a moving object, which is initially at a distance and is gradually coming closer, is assumed. During the processing in the initial mode, the value at the time of the first recognition of the object is maintained. After the initial mode is switched to the normal mode, the target size of the object is switched to the predetermined target position. The object size in the pickup image is adjusted to fit to the target position. The zoom control is performed so that the object size is maintained.

As described above, after the initial mode is switched to the normal mode, the target size (target position) of the object to be used is changed and the zoom control is performed. As a result, the speed of the object in the image on the screen is not affected by a change in distance between the object and the camera platform 10. Therefore, the stable panning and tilting control can be performed. Similarly, the speed of the object in the image on the screen is no longer affected by the distance. Therefore, the movement vector of the object in the initial mode can be used. Therefore, the technique of the fifth embodiment can be used for the method of updating the target coordinates using the movement vector according to the third embodiment. In the fifth embodiment, a relative speed change of the object in the image on the screen is suppressed by maintaining the value of the object by using the zoom control during the processing in the initial mode. Therefore, the fifth embodiment exhibits higher effects under conditions under which a change amount of the object size in the image on the screen during the processing in the initial mode cannot be neglected.

In the first to fifth embodiments described above, the case where the technique of recognizing the object is realized by the image recognition has been described as an example. However, other recognition unit, for example, object recognition using radar can also be used. Moreover, although the coordinate $X_{tgt}$ in the horizontal direction on the pickup image is used as the target coordinate for capturing the object, a coordinate in a vertical direction may be set instead. Moreover, in place of the coordinates of one point, a target range having a certain extent range may also be set. Further, the object has been described as moving from right to left direction. However, the direction of movement of the object is not particularly limited. Moreover, although the image processor 43, the operation apparatus communication unit 46, the platform communication unit 47, and the tracking processing apparatus CPU 45 are described as independent components in the tracking processing apparatus 40, a single CPU may have the functions for the processing of the above-mentioned components. As for the template memory 44, a memory included in the CPU may be used. Further, the functions of the tracking processing apparatus 40 may be incorporated into the camera platform 10 or may be integrated with the platform CPU 11.

The exemplary embodiments of the present invention have been described above. However, the present invention is not limited to these exemplary embodiments, and various modifications and changes can be made thereto within the gist of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-282226, filed Dec. 26, 2012, which is hereby incorporated by reference herein in its entirety.

What is claimed is:

1. An automatic tracking image pickup system, comprising:
   an image pickup apparatus picking up an image of an object;
   a driving unit changing an image pickup direction of the image pickup apparatus;
   a recognition unit recognizing an object to be tracked in a pickup image obtained by the image pickup apparatus; and
   a controller controlling a speed of the driving unit based on a difference between a position of the object to be tracked in the pickup image and a target position in the pickup image, wherein:

the controller controls the speed of the driving unit in an initial mode until the object to be tracked reaches a predetermined position in the pickup image after the recognition unit recognizes the object to be tracked for first time, and in a normal mode after the object to be tracked reaches the predetermined position; and the controller controls the speed of the driving unit so that a gain for obtaining the speed of the driving unit based on the difference in the normal mode becomes larger than a gain used in the initial mode.

2. An automatic tracking image pickup system according to claim 1, wherein the controller determines the speed of the driving unit so that the speed of the driving unit becomes lower in the initial mode and becomes higher in the normal mode as the difference between the position of the object to be tracked in the pickup image and the target position in the pickup image becomes larger.

3. An automatic tracking image pickup system according to claim 1, further comprising a target value calculator calculating the target position to be used by the controller, wherein the target value calculator updates the target position during processing in the initial mode and uses the target position, which is preset, during processing in the normal mode.

4. An automatic tracking image pickup system according to claim 3, wherein the target value calculator calculates the target position during the processing in the initial mode based on a position at which the object to be tracked is recognized in the pickup image for the first time and the target position used during the processing in the normal mode.

5. An automatic tracking image pickup system according to claim 3, further comprising a moving speed calculator calculating a moving speed of the object to be tracked, wherein the target value calculator calculates the target position based on the moving speed of the object to be tracked, which is calculated by the moving speed calculator.

6. An automatic tracking image pickup system according to claim 1, wherein:

the image pickup apparatus comprises a zoom optical system; and the controller sets a zooming speed to zero in the initial mode and determines the zooming speed so that a size of the object to be tracked in the pickup image becomes constant in the normal mode.

7. An automatic tracking image pickup system according to claim 1, wherein:

the image pickup apparatus comprises a zoom optical system;

the controller determines a zooming speed in the initial mode so that a size of the object to be tracked, which is obtained when the object to be tracked is recognized in the pickup image, is maintained; and the controller determines the zooming speed in the normal mode so that a predetermined size of the object to be tracked is maintained in the pickup image.

8. An automatic tracking image pickup system, comprising:

an image pickup apparatus picking up an image of an object;

a driving unit changing an image pickup direction of the image pickup apparatus;

a recognition unit recognizing an object to be tracked in a pickup image obtained by the image pickup apparatus; and a controller controlling a speed of the driving unit based on a difference between a position of the object to be tracked in the pickup image and a target position in the pickup image, wherein:

the controller controls the speed of the driving unit in an initial mode until the object to be tracked reaches a predetermined position in the pickup image after the recognition unit recognizes the object to be tracked for first time, and in a normal mode after the object to be tracked reaches the predetermined position; and the controller controls the speed of the driving unit so that the speed of the driving unit when the object to be tracked is at a position in the picked up image in the initial mode becomes lower than the speed of the driving unit when the object to be tracked is at the position in the picked up image in the normal mode.

9. An automatic tracking image pickup system according to claim 8, wherein the controller controls the speed of the driving unit so that a gain for obtaining the speed of the driving unit based on the difference in the normal mode becomes larger than a gain used in the initial mode.

10. An automatic tracking image pickup system according to claim 8, wherein the controller determines the speed of the driving unit so that the speed of the driving unit becomes lower in the initial mode and becomes higher in the normal mode as the difference between the position of the object to be tracked in the pickup image and the target position in the pickup image becomes larger.

11. An automatic tracking image pickup system according to claim 8, further comprising a target value calculator calculating the target position to be used by the controller, wherein:

the target value calculator updates the target position during processing in the initial mode and uses the target position, which is preset, during processing in the normal mode.

12. An automatic tracking image pickup system according to claim 11, wherein the target value calculator calculates the target position during the processing in the initial mode based on a position at which the object to be tracked is recognized in the pickup image for the first time and the target position used during the processing in the normal mode.

13. An automatic tracking image pickup system according to claim 11, further comprising a moving speed calculator calculating a moving speed of the object to be tracked, wherein the target value calculator calculates the target position based on the moving speed of the object to be tracked, which is calculated by the moving speed calculator.

14. An automatic tracking image pickup system according to claim 8, wherein:

the image pickup apparatus comprises a zoom optical system;

the controller sets a zooming speed to zero in the initial mode and determines the zooming speed so that a size of the object to be tracked in the pickup image becomes constant in the normal mode.

15. An automatic tracking image pickup system according to claim 8, wherein:

the image pickup apparatus comprises a zoom optical system;

the controller determines a zooming speed in the initial mode so that a size of the object to be tracked, which is obtained when the object to be tracked is recognized in the pickup image, is maintained; and the controller determines the zooming speed in the normal mode so that a predetermined size of the object to be tracked is maintained in the pickup image.

16. An automatic tracking image pickup system, comprising:
- an image pickup apparatus picking up an image of an object by using a zoom optical system;
- a driving unit changing a focal length of the zoom optical system to change a size of an image of the object in a pickup image obtained by the image pickup apparatus;
- a recognition unit recognizing an object to be tracked in the pickup image obtained by the image pickup apparatus; and
- a controller controlling the zoom optical system based on a difference between a size of the object to be tracked in the pickup image and a target size, wherein:
- the controller controls a zooming speed of the zoom optical system in an initial mode until the size of the object to be tracked becomes equal to a predetermined size in the pickup image after the recognition unit recognizes the object to be tracked for first time, and in a normal mode after the size of the object to be tracked reaches the predetermined size; and
- the controller controls the zooming speed by the driving unit so that a gain for obtaining a speed of the driving unit, which is used in the normal mode, based on the difference becomes larger than a gain used in the initial mode.

17. An automatic tracking image pickup system, comprising:
- an image pickup apparatus picking up an image of an object by using a zoom optical system;
- a driving unit changing a focal length of the zoom optical system to change a size of an image of the object in a pickup image obtained by the image pickup apparatus;
- a recognition unit recognizing an object to be tracked in the pickup image obtained by the image pickup apparatus; and
- a controller controlling the zoom optical system based on a difference between a size of the object to be tracked in the pickup image and a target size, wherein:
- the controller controls a zooming speed of the zoom optical system in an initial mode until the size of the object to be tracked becomes equal to a predetermined size in the pickup image after the recognition unit recognizes the object to be tracked for first time, and in a normal mode after the size of the object to be tracked reaches the predetermined size; and
- the controller controls the zooming speed of the driving unit so that the zooming speed of the driving unit when the object to be tracked has a size in the picked up image in the initial mode is lower than the zooming speed of the driving unit when the object to be tracked has the size in the picked up image in the normal mode.

* * * * *